INVENTORS.
JACK E. SMITH
PHILIP O. GARNER
BY THEIR ATTORNEYS.
HARRIS, KIECH, RUSSELL & KERN

United States Patent Office 3,529,856
Patented Sept. 22, 1970

3,529,856
COUPLING AND METHOD OF FORMING SAME
Jack Edward Smith, Whittier, and Philip Owen Garner, La Puente, Calif., assignors to Dumont Aviation Associates, Lakewood, Calif., a corporation of California
Filed Jan. 8, 1969, Ser. No. 789,745
Int. Cl. F16l 13/14
U.S. Cl. 285—343                                    4 Claims

ABSTRACT OF THE DISCLOSURE

A coupling for tubing and fittings and a method of forming same, including a length of tubing or the like and a fitting member with a recessed portion to receive an end of the tubing, a ring member slidably mounted around said tubing and movable to a position abutting the fitting within said recessed portion, and an annular ferrule member slidably mounted around said tubing adjacent said ring member and movable into cutting engagement with said ring member within said recessed portion, a portion of said ring member being deformed radially outwardly about said ferrule member and against the surface of said recessed portion, and a portion of said ring member being deformed radially inwardly about said ferrule member and against the outer surface of said tubing to form a bonded joint therewith. An annular portion of the tubing may be depressed inwardly and a portion of the fitting member may be deformed outwardly during deformation of said ring member. Heat may be applied to said ring member prior to its movement into position abutting said fitting member.

---

Figure 1:
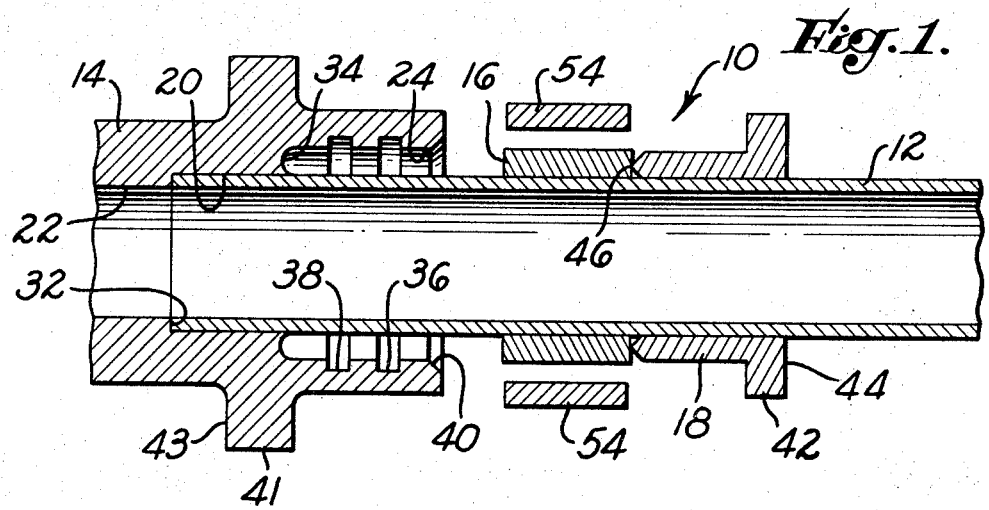

This invention relates to couplings and to a method for their formation, and more particularly to couplings for tubing and fittings which carry fluid under high pressures and under wide temperature ranges. Although the invention is directed principally to couplings and their method of formation for such tubing and fittings, any related use for the joining of an elongated member with a suitable receiving member is intended to be within the scope of the invention.

There are many and various forms of coupling or sealing devices for providing interconnection between fittings and tubing or shaped sections. Where the couplings or sealing devices are used in conjunction with the flow of fluids under high pressures and under wide temperature ranges, it is extremely important to provide a pressure-tight and leak-proof connection as well as a connection which is fracture or shock-proof. A simple threaded device will not function properly and meet the requirements under such conditions of high stress, temperature and pressure.

Current devices may be of the flare-type fitting, compression fitting self-aligning, inverted flare fittings, threaded, locking-type with O-rings, serrated gripping, and a combination of threading and O-rings.

Of these connections currently employed, problems have developed with forming a proper seal as well as with the creation of stress points in the tubing or fittings which are subject to cracking under vibration and heavy stress conditions. Additionally, many current assemblies utilize precious metals and require X-ray inspection to check reliability of the results.

It is an object of our invention, therefore, to provide a coupling for tubing and fittings which is easily assembled and formed.

Another object of our invention is to provide such a coupling which is pressure-tight and shock-resistant.

A further object of our invention is to provide such a coupling where a ring member is deformed into bonded surface engagement with the tubing and the fitting. Another object is to provide such a coupling assembly where the alloy-type member is deformed radially inwardly and outwardly about a ferrule member.

The invention may be summarized as including, and a more specific object of the invention is to provide a coupling which includes: an elongated member such as a tubing; a receiving member including means defining an opening for receiving an end of the elongated member; a ring member on the elongated member within the opening; a ferrule member on the elongated member at least partially within the opening and embedded in the ring member with a first portion of the ring member extruded radially inwardly of the ferrule member and against the outer surface of the elongated member, and with a second portion of the ring member extruded radially outwardly of the ferrule member and against the interior surface of the receiving member; a portion of the elongated member being bowed inwardly about the first portion of the ring member; a portion of the receiving member being bowed outwardly about the second portion of the ring member; and the bowed portion of the receiving member being provided in its interior surface with at least one annular groove into which a part of the second portion of the ring member is extruded.

Yet another object of our invention is to provide such a fitting permitting visual inspection as a highly reliable means of testing results.

The invention, both as to its organization and method of operation, together with further objects and advantages thereof, may best be understood by reference to the following description taken in connection with the accompanying drawing.

Figure 2:
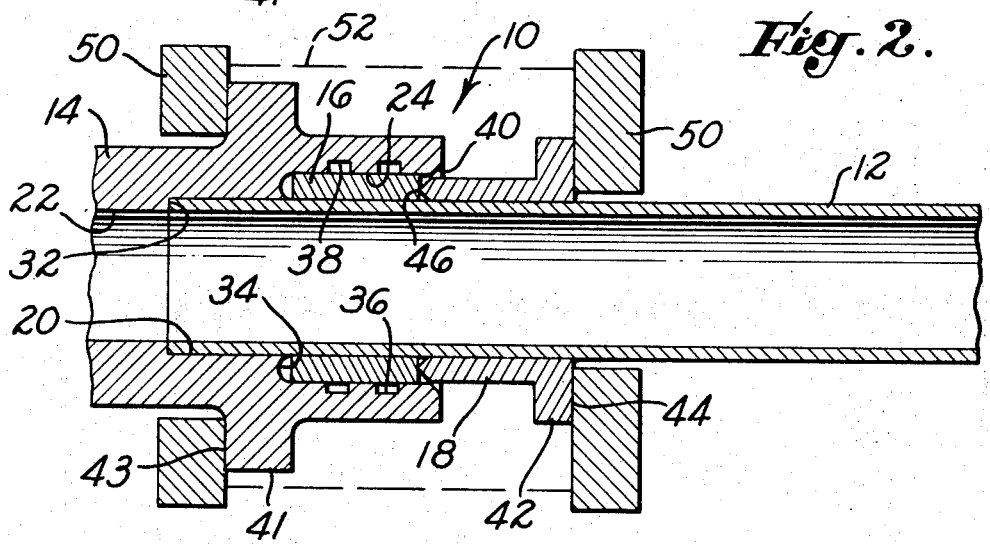
Figure 3:
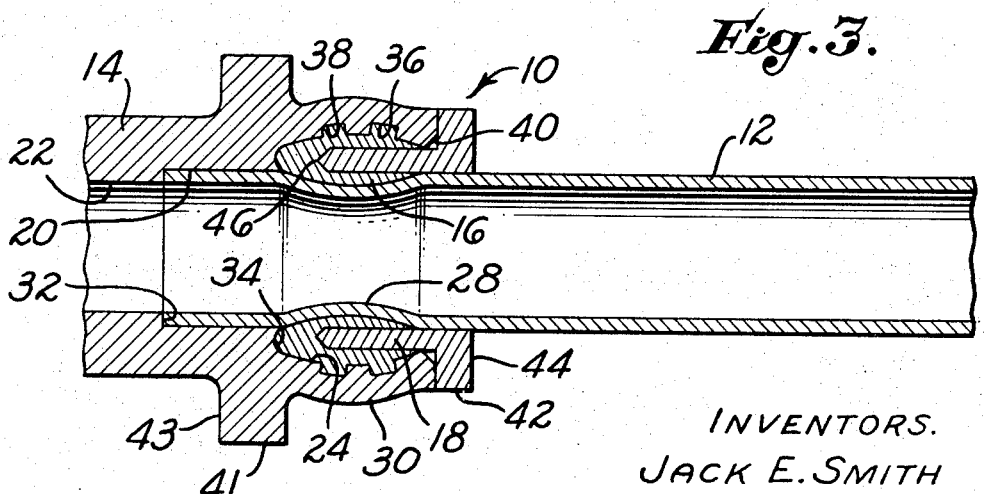

In the drawing:
FIG. 1 is a fragmentary vertical sectional view of our coupling assembly prior to its structural connection;
FIG. 2 is a vertical sectional view similar to FIG. 1 with the ring member and ferrule member moved relative to the tubing; and
FIG. 3 is a vertical sectional view similar to FIG. 2 after the assembly has been structurally connected.

Referring now to the drawing, a coupling assembly 10 includes a tubing member 12 and a fitting member 14 with a ring alloy member 16 and a ferrule member 18 slidably mounted around the tubing member 12. The fitting member 14 includes a recessed portion 20 to receive an end of the tubing member 12 to preferably align the tubing member 12 with a throat section 22 of the fitting member 14. The recessed portion 20 may include an enlarged or chamber portion 24 to receive the ring member 16 in abutting engagement with the fitting member 14 as indicated in FIG. 2. Pressure applied by the ferrule member 18 to the ring member 16 or a combination of heat and pressure will cause the ring member 16 to deform or extrude radially inwardly and outwardly about the ferrule member 18 and against the inner surface of the chamber 24 of the recessed portion 20 and the outer surface of the tubing 12 (FIG. 3). A surface bond or interlock is formed between the extruded ring member 16 and the fitting member 14 and the tubing 12 to provide not only a pressure-tight seal for the coupling assembly but a structural joint as well. The deformation of the ring member 16 may cause inward depression of an annular portion 28 of the tubing 12 as well as the outward deformation of a portion 30 of the fitting member 14.

Although the invention is principally intended for the coupling of a length of tubing with a fitting member, any use for the structural connection between an elongated member and a receiving member is intended to be within the scope of the invention. In this regard, the tubing 12 can be hollow as shown or could also be a solid member, and the outer surface of the tubing 12 may be smooth, knurled, threaded, or a machine shape. The fitting member can be a straight-through fitting as shown or can be a porting, angle, or T-type fitting or any other suitable type of receiving member. Where the coupling assembly is to be used with the transport of a fluid or fluids under high pressures and under wide temperature ranges, the tubing 12 and fitting member 14 preferably are constructed of high-strength metallic or metallic alloy materials such as high-strength steel or a steel alloy.

More particularly, and in the illustrated form of my invention, the tubing member 12 is a straight length of symmetrical tubing. An end of the tubing 12 is snugly received within a circular recess 20 of the fitting member 14, against an annular shoulder 32 of the recess 20. The enlarged or chamber portion 24 of the recess 20 preferably is circular in configuration and is sized to receive the ring member 16. The chamber 24 preferably has an arcuate configuration 34 as a shoulder along its innermost portion and may include a single or preferably a pair of annular parallel recesses or grooves 36 and 38 extending about its circumference. The fitting member 14 may include an annular beveled portion 40 at the entrance of the chamber 24 to provide an enlarged opening for the chamber 24 and recess portion 20. The fitting 14 may also include an annular flange member 41 to form an annular shoulder 43 to support a clamping force.

The ring member 16 is slidably mounted on the tubing 12 and preferably is sized to be snugly received around the tubing 12. The ring member 16 is also sized to be snugly received within the chamber 24 of the recessed portion 20 of the fitting member 14 as indicated in FIG. 2. The ring member 16 abuts against the shoulder or arcuate portion 34 of the chamber 24 of the fitting 14 as indicated. The ring member 16 may be metallic or nonmetallic and can be formed of various materials, such as aluminum, plastic, a bronze-lead alloy, or a nickel-silver alloy for example.

The ferrule member 18 is a ring or sleeve-type member and is sized to be snugly and slidably mounted around the tubing 12. The ferrule member 18 may include an annular flange portion 42 at its rear end to provide an annular shoulder or rear face 44. The forward end of the ferrule member 18 is cut back to form an annular cutting or splitting edge 46 which is to be positioned against the ring 16 (FIG. 2) before pressure is applied to the assembly. The ferrule 18 is formed of a metallic substance, such as for example a high-strength steel or steel-alloy material.

In forming the coupling assembly, a specially designed tool is employed. The tool includes a pair of clamping jaws 50 (FIG. 2) interconnected by a connection 52, schematically indicated, and controlled by an air-operated cylinder to provide the necessary clamping action for the closing of the component parts of the coupling assembly. A thermostatically controlled heater element 54 for the ring member 16 is also included (FIG. 1).

To form the constructed coupling, the tubing 12 is seated within the fitting member 14 within the recessed portion 20 and against the shoulder 32. Preferably the bore of the tubing 12 is axially aligned with the throat section 22 of the fitting member 14. The ring member 16 and the ferrule member 18 are slidably mounted on the tubing 12. The ring 16 and ferrule 18 could, however, be mounted on the tubing 12 prior to its seating within the recess 20 of the fitting member 14. The tool assembly is then positioned about these assembled members with the ring member 16 and ferrule 18 extended a short distance from the fitting 14. The jaws 50 are positioned adjacent the shoulder 43 of the fitting member 14 and the shoulder 44 of the ferrule member 18. The thermostatically controlled heater element 54 is clamped on the ring member 16 and heat is applied for a controlled period of time. When this controlled period has elapsed, the heater 54 is removed from engagement with the ring 16 and the jaws 50 are closed to slide the ring 16 and ferrule 18 along the tubing 12 to position the ring 16 within the chamber 24 and abutting the fitting member 14 at the shoulder 34. The annular cutting edge 46 of the ferrule 18 is placed against the ring 16. Pressure is then applied to the ferrule 18 whereupon the ring member 16 is deformed or extruded radially inwardly and outwardly about the ferrule 18 (FIG. 3). The ring member 16 is deformed against the surfaces of the chamber 24 and into the annular recesses 36 and 38 as well as against the adjacent outer surface of the tubing 12 as indicated. Because of the pressure applied, or the pressure in combination with the heated ring 16, a structural bond or interlock is formed between the extruded ring 16 and the fitting member 14 and the tubing 12. A structural joint is formed, therefore, between the tubing and the fitting which locks the coupling structurally together, without removal of the ferrule member 18.

Because of the pressure and deformation of the ring 16, an annular portion 28 of the tubing 12 may be deformed or depressed inwardly forming a grooved portion in the tubing 12. This depressed groove 28 of the tubing 12 when combined with the deformed ring 16 provides a structural lock to the coupling. Additionally, the fitting member 14 may be deformed outwardly along a portion 30 as shown in FIG. 3 to provide yet another lock for the entire coupling assembly. The grooves 36 and 38 in the fitting 14 permit the deforming of the portion 30 outwardly in the form as shown.

By visually checking the relative outside diameter deformation of the fitting member 14, a highly reliable measure of the amount of deformation of the ring member 16 is provided which in turn gives a highly reliable measure of the structural strength of the coupling itself, an object of the invention. The structural bond between the tubing 12 and the fitting 14 provides a pressure-tight lock with no sharp edges or strain points, thereby providing a shock or fracture-proof coupling of greatly improved construction over the couplings currently employed, a further object of our invention.

Although we have described in some detail an embodiment of our invention, changes, modifications, and substitutions may be made therein without departing from the spirit of the invention. We therefore intend that our invention be limited in scope only by the terms of the following claims.

We claim:
1. In a coupling, the combination of:
   (a) an elongated member having an outer surface;
   (b) a receiving member including means defining an opening for receiving an end of said elongated member and having an interior surface;
   (c) a ring member on said elongated member within said opening;
   (d) a ferrule member on said elongated member at least partially within said opening and embedded in said ring member with a first annular portion of said ring member located radially inwardly of said ferrule member and against the outer surface of said elongated member and with a second annular portion of said ring member located radially outwardly of said ferrule member and against the interior surface of said receiving member; and
   (e) an annular portion of said receiving member being bowed outwardly by said second portion of said ring member.

2. A coupling as defined in claim 1 wherein an annular portion of said elongated member is bowed inwardly by said first portion of said ring member.

3. A coupling according to claim 2 wherein said outwardly bowed annular portion of said receiving member is provided in its interior surface with at least one annular groove filled by a part of said second portion of said ring member.

4. A method of forming a coupling between an elongated member and a receiving member having a recessed portion, characterized by the use of an extrudable ring member and a ferrule member, and including the steps of:
  (a) positioning an end of the elongated member within the recessed portion of the receiving member;
  (b) preheating the ring member to a temperature less than its fusion temperature to facilitate extrusion thereof;
  (c) terminating the preheating of the ring member;
  (d) subsequently sliding the preheated ring member along the elongated member into abutting engagement within the receiving member within the recessed portion;
  (e) then sliding the ferrule member along the elongated member to a position adjacent the ring member; and
  (f) thereafter applying pressure to the ferrule member to embed the ferrule within the ring thereby extruding a portion of the ring member radially inwardly of the ferrule member and between the ferrule member and the outer surface of the elongated member, and another portion of the ring member radially outwardly of the ferrule member and between the ferrule member and the surface of the recessed portion to such an extent that a portion of said receiving member is bowed outwardly by said another portion of the ring member.

References Cited

UNITED STATES PATENTS

| | | | |
|---|---|---|---|
| 317,408 | 5/1885 | Moeser | 285—341 |
| 1,192,927 | 8/1916 | Mosher | 285—382.7 X |
| 2,312,579 | 3/1943 | O'Brien | 285—341 X |

FOREIGN PATENTS

| | | |
|---|---|---|
| 627,206 | 5/1927 | France. |
| 315,525 | 7/1929 | Great Britain. |
| 819,435 | 9/1959 | Great Britain. |
| 408,565 | 9/1966 | Switzerland. |

DAVE W. AROLA, Primary Examiner

U.S. Cl. X.R.

29—432.1, 506, 520; 285—382.2